Sept. 2, 1952 R. A. ARTHUR 2,608,985
FLOW CONTROL VALVE
Filed March 3, 1945
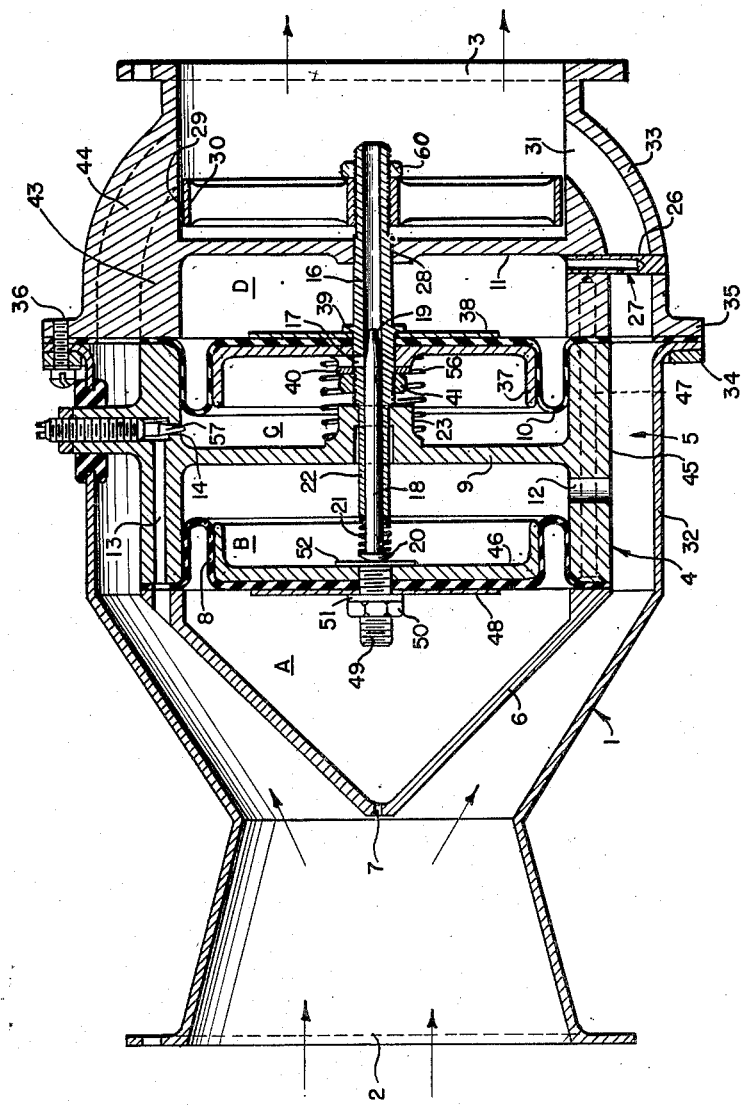
INVENTOR.
ROBERT A. ARTHUR
BY 
ATTORNEY Patented Sept. 2, 1952

2,608,985

UNITED STATES PATENT OFFICE 2,608,985

FLOW CONTROL VALVE

Robert A. Arthur, Santa Monica, Calif., assignor to The Garrett Corporation, Airesearch Manufacturing Company division, Los Angeles, Calif., a corporation of California Application March 3, 1945, Serial No. 580,805

7 Claims. (Cl. 137—81)

This invention relates to valves for controlling the flow of fluid and is particularly useful in controlling the inflow of air into a cabin of an aircraft in which the pressure is kept under control.

In the pressurizing of aircraft cabins it is necessary not only to constantly regulate the pressure in the cabin as the plane changes altitude, but also to maintain an adequate ventilation of the cabin in order that the passengers may be supplied with a suitable quantity of fresh air. It is customary in the pressurization systems employed for this purpose to supply the cabin with air taken from the external atmosphere through a ram inlet, the mouth of which is forwardly directed, into which a portion of the volume of air met with by the plane in its forward flight is pushed. Pressure is developed in this inlet proportionate to the speed of the plane. These variations in pressure will be reflected in variations in density of the air entering the cabin. Consequently, in the absence of adequate control mechanism, there would be a variation in the mass volume of air being passed through the cabin in a given unit of time.

It is often necessary to regulate the temperature of the air entering the cabin. The compression of the air prior to introducing it into the cabin will heat it, to a considerable extent and where ambient temperature is already at a high level, it may be necessary to cool the air before it enters the cabin. On the other hand, where the plane is flying through extremely cold air, it may be necessary to heat the air before it is introduced into the cabin. Whenever such temperature control is necessary, and even under conditions not requiring temperature regulation, it is important that the mass volume of air passing through the cabin per unit of time be maintained at a sufficiently high level and yet not excessive. For example, it would be uneconomical to condition a greater volume of air than that required for adequate ventilation.

The general object of the present invention is to provide an improved mass flow regulator valve which is adapted to control the flow of air into an enclosure to a relatively uniform rate measured in weight flow per unit of time.

A further object is to provide a control valve particularly adaptable to control the flow of air into a cabin when the ratio between inlet pressure and cabin pressure is in a super critical condition.

A further object of the invention is to provide a flow control valve which is adapted to control the flow therethrough in response to changes in both static pressure and dynamic pressure of the air flowing through the valve.

Another object is to provide a valve which is responsive differentially to both the velocity and static pressure of the air flowing therethrough, for controlling the flow in such a manner as to achieve a substantially uniform flow measured in weight flow per unit of time.

A further object of the invention is to provide a valve which is adapted to control the flow of air therethrough by self contained mechanism therein, interposed in the path of the airflow.

Another object of the invention is to provide a valve which, in addition to the functions set forth above, is of relatively inexpensive and durable construction.

Further objects and advantages of the invention will be brought out in the following part of the specification.

Referring to the accompanying drawing which is for illustrative purposes only, the figure shows a longitudinal, axial, sectional view through a flow control valve embodying the invention.

As an example of one form in which the invention may be embodied, I have shown in the drawing a flow control valve comprising a casing 1 having an inlet 2 adapted to be connected to a duct through which air is received from a ramming inlet opening or from a supercharger and having an outlet 3 through which the air is delivered to the cabin. Within the casing 1 is a core member 4, spaced from the wall of the casing to define an annular flow passage 5 extending from the inlet 2 to the outlet 3. The core member 4 has a conical nose portion 6 which spreads the stream coming through the inlet 2 and which has in its forward tip an opening 7, through which the velocity impact of the air builds up pressure in a chamber A therewithin.

The chamber A is defined between the nose portion 6 and a flexible diaphragm 8. The core member 4 has an intermediate transverse partition 9 which defines, with the diaphragm 8, a chamber B. Rearwardly of the partition 9 is a second diaphragm 10 and rearwardly of the diaphragm 10 the core member 4 is provided with a second, or rear, transverse wall 11. The diaphragm 10 divides the space within the core member 4 between the walls 9 and 11 into a chamber C and a chamber D.

As previously indicated, the chamber A is subjected to pressure developed by the velocity of the air flowing through the inlet 2. The total pressure in the chamber A will therefore be the velocity head plus the static pressure of the air flowing through the annular flow path 5. The pressure in the chamber B is equivalent to the static pressure of the air flowing through the annular passage 5, the latter being in communication with the chamber B through an opening 12.

Air is admitted to the chamber C through a bore 13 in the wall of the core member 4 and a port 14 extending laterally through the core wall and connecting the bore 13 to the chamber C, there being both static and impact or dynamic pressure in said bore 13 which is transmitted to said chamber C. Controlled escape of the air thus admitted to the chamber C is provided for by an orifice 17 and a bore 16 in a valve stem 22. The stem 22 is fixed in the diaphragm 10, is slidably extended through a bearing bore 28 in the partition 11, and opens into the outlet 3. The other end of the stem 22 is slidably extended through a bearing bore in a boss 23 of the partition 9. Control of the escape of the air through the bore 16 is effected by a needle valve 19 which cooperates with the orifice 17. The needle valve 19 is formed on one end of a valve pin 18 which is slidably mounted in the stem 22. On its outer end the stem 22 carries a valve element 30, which cooperates with an annular port 31, to variably restrict the flow from the passage 5, of which the port 31 constitutes the exit into the outlet 3. An annular recess 29 in the rear end of the core member 4 receives the valve element 30 when the latter is retracted.

The valve pin 18 has a head 20 which engages the diaphragm 8 under the pressure of a light spring 21 engaged between the head and the end of the stem 22, and thus the pin 18 will shift axially in response to the movement of the diaphragm 8.

Static pressure and velocity head are transmitted to the chamber D through a scoop tube 26 which has an orifice 27 facing the flow in the passage 5.

Referring now to structural characteristics which are not essential to the invention in its broader aspects, but which are of importance in the construction of a practical valve embodying the invention, the casing 1 is formed in two sections 32 and 33, having flanges 34 and 35 respectively, by means of which they are secured together by screws 36. The peripheral region of the diaphragm 10 is clamped between the flanges 34 and 35 and the central region is clamped between a cup member 37 and a washer 38 which in turn are clamped between a shoulder 39 on the stem 22 and a washer 40 and nut 41, the latter being threaded onto the stem 22.

The core member 4 is formed in three parts, namely—a core section 43, which is integral with the casing section 33 and connected thereto by a web or series of webs 44, an intermediate section 45, and the nose section 6, which is suitably secured to the section 45. The section 45 in turn is secured to the section 43 by long screws extending longitudinally through the wall of the section 45 and threaded into the section 43, the screws being indicated in dotted lines at 47.

The diaphragm 10 is clamped between the sections 43 and 45 and the diaphragm 8 is clamped between the sections 45 and 6. The diaphragm 8 in its central region is clamped between a cup 46 and a washer 48 by means of a bolt 49, a washer 51 and a nut 50 threaded onto the bolt 49. The head 52 of the bolt 49 engages the head of the valve pin 18.

The recess 29 is preferably formed as a cylindrical bore constituting a continuation of the outlet 3, and the valve element 30 has a cylindrical annulus fitting loosely within said bore.

In the operation of the valve, the position of the valve element 30 is dependent upon the position of the diaphragm 10 which in turn is determined by the balancing of pressure in the chamber D (tending to move the valve element 30 toward its open position) against the pressure in the chamber C plus the pressure of a spring 56 (tending to move the valve element 30 toward its closed position, restricting the outlet 31). The position of the diaphragm 10, in which the opposing pressures thereagainst will thus be balanced, is in turn determined by the position of the diaphragm 8, which functions as a pilot member. The pilot diaphragm 8 controls the position of the diaphragm 10 through the needle valve pin 18, valve 19, and orifice 17. Maintained in constant engagement with the abutment head 52 of the diaphragm 8 by the light coil spring 21, which is under a normal compression sufficient to balance the pressure difference between chambers A and B in all positions of the main valve, the valve pin 18 will shift axially in unison with the movement of the diaphragm 8. Any sudden shifting movement of the valve 19, tending to restrict or enlarge the flow through the orifice 17, will be followed by a resultant temporary rise or fall respectively of the pressure in the chamber C which in turn will cause a shift of the diaphragm 10 corresponding to the shift of the needle valve 19, the diaphragm 10 coming to rest in its new position when the former relative position of the needle valve 19 and orifice 17 have been reestablished and the balance between pressures in the chambers C and D consequently restored. Temporary fluctuations in pressure in the chamber C arises as follows: When the pressures in these two chambers are balanced, the escape of air from the chamber C through the orifice 17 will just balance the inflow through the passage 13 and orifice 14 equivalent to the velocity head in the inlet 2, i. e., the difference between velocity head plus static pressure (the pressure in the chamber A) and static pressure alone (the pressure in the chamber B). This pressure differential is more than ample for shifting the valve pin 18 within the hollow stem 22. In this connection, it may be noted that each time the diaphragm 8 shifts the pin 18 rightward (thus temporarily further compressing the spring 21 a very slight amount) the corresponding rightward movement of the diaphragm 10 will withdraw the hollow stem 22 so as to restore the previous relative positioning of the pin 18 and stem 22 and thereby relieve the compression in the spring 21 back to its original loading. Moreover, this rightward shift of the diaphragm 8 is hardly more than enough to shift the entire spring 21 in the same direction due to the almost instantaneous corresponding movement of the diaphragm 10. Consequently, the spring 21 has such slight effect that it is not a material factor in the movement of the diaphragm 8. Thus, the pressure differential on the diaphragm 8 need be only high enough to slide the pin 18 within the stem 22 against the slight frictional resistance of the bore 16, and the diaphragm 10, faithfully following the shifting movement of the pilot diaphragm 8, will shift the valve 30 to the exact position determined by the pilot valve with ample power provided by the full pressure drop between the inlet 2 and the outlet 3. This pressure drop occurs largely at the discharge end 31 of the annular flow path 5, the cross sectional area of the latter being maintained substantially uniform from the beginning thereof (in the plane of the forward extremity of the nose portion 6), to the exit 31. Thus the velocity head and static pressure at the scoop tube 26 is substantially the same as at the forward end of the annular flow path. The cross-sectional area of the annular flow path is so proportioned to the outlet 3 that the pressure drop will be ample even when the valve element 30 is in fully opened position shown in the drawing.

By controlling the pilot diaphragm 8 through a pressure differential corresponding to velocity head in the chamber A, I find that it is possible to control the exit orifice 31 in such a manner as to maintain a substantially uniform mass flow of air per unit of time. Any increase in inlet velocity caused by an increase in pressure (representing an increase in mass flow per unit of time) will result in a rightward movement of the pilot diaphragm 8, followed by a corresponding rightward movement of the power diaphragm 10 and valve element 30, thus throttling the flow through the exit orifice 31 so that the net resulting mass flow per unit of time will remain the same.

A needle valve 57 controls the passage 13, 14 for adjusting the bleed into the chamber C, and varying the adjustment of said valve 57 determines the sensitivity of the mechanism.

The valve element 30 is adjustably secured on the valve stem 22 by being threaded onto the threaded portion on the end of the stem and secured by a jam nut 60.

I claim as my invention:

1. In a flow control valve, means defining a passage for the flow therethrough of a fluid to be controlled, there being high and low pressure regions therein, a valve element for throttling the flow through said passage; a power servomotor for moving said valve element, said servomotor comprising a pressure responsive element and means defining on the respective sides thereof a pair of fluid pressure chambers, one of which is in communication with the high pressure region of said passage; means for directing a restricted flow of fluid from a high pressure region of said passage into the other of said chambers; a tubular valve stem connecting said pressure responsive element to said valve element and providing a passage for the escape of fluid from said other chamber to a low pressure region of said passage; and means including a pilot servomotor responsive to a pressure differential between velocity head and static head within said passage, and a pilot valve pin actuated by said pilot servomotor and cooperating with said tubular valve stem for controlling said escape of fluid from said other chamber in such a manner as to cause said power servomotor to follow the movements of said pilot servomotor whereby movement of the pilot servomotor positions said pilot valve pin to restore the rate of flow through the device to a predetermined value.

2. In a flow control valve: means defining a passage for the flow therethrough of a fluid to be controlled, there being high and low pressure regions therein; a valve element for throttling said flow; a power servomotor for moving said valve element, said servomotor including a diaphragm and a pair of transverse partition walls cooperating with said passage defining means to form with said diaphragm on the respective sides thereof a pair of fluid pressure chambers; a tubular valve stem extending through and secured to said diaphragm and extending through and slidably mounted in said partition walls, said valve element being mounted on one end of said tubular stem, said tubular valve stem having, within one of said chambers, a lateral inlet orifice and providing, from said inlet orifice to said end which carries said valve element, a passage for the controlled escape of fluid from said one chamber; means providing for a restricted flow of fluid from a high pressure area of said passage into said one chamber; passage means for supplying fluid pressure from the region of high pressure in said passage to said other chamber; and means for controlling the escape of fluid from said one chamber through said valve stem, said last means comprising a valve pin slidably extended into said valve stem from the end thereof opposite said valve element and cooperating with said inlet orifice, and a pilot servomotor including a diaphragm with which said valve stem is operably connected; and means including said flow passage forming means and one of the aforesaid transverse partition walls, defining a pair of fluid pressure chambers on the respective sides of the last mentioned diaphragm, of which chambers one is subject to static pressure in said passage and the other of which is subject to said static pressure plus the velocity head in the fluid entering said passage, said power servomotor following the movements of said pilot servomotor as a result of the control of the escape of fluid from said one chamber of said power servomotor, and said pilot servomotor responding to pressure changes in such a manner as to cause said throttling valve element to be moved in throttling direction when the velocity head in said passage increases.

3. A flow control valve as defined in claim 2, including spring means opposing the movement of said power servomotor which results from decreased pressure in said one chamber thereof.

4. A flow control valve as defined in claim 2, including spring means opposing the movement of said power servomotor which results from decreased pressure in said one chamber thereof, and including a light compression spring interposed between the end of said tubular valve stem within said pilot servomotor and a head on said valve stem which is in abutting contact with the diaphragm of said pilot servomotor.

5. A flow control valve, comprising: means defining a passage for fluid, the flow of which through said passage is to be controlled, portions of said passage being so proportioned that there are high and low pressure regions therein; a valve element biasing in the closing direction controlling the flow of fluid through said passage; a pressure responsive element; a tubular member connecting said pressure responsive element and said valve element so that movements of the pressure responsive element effect corresponding movements of the valve element; means defining fluid pressure chambers on the respective sides of said pressure responsive element, one of said chambers being connected with the high pressure region of said passage and the other of said chambers being in communication with said high pressure region through a restricted connection, said tubular member providing an outlet connection between the one chamber and said low pressure regions; and pilot valve means, including a movable wall responsive to variations in the differential of pressure on opposite sides thereof, one side being subjected to velocity head pressure in said passage, and the opposite side being subjected to static pressure within said passage, a pilot valve pin actuated by said movable wall controlling the flow of fluid through said tubular member in such a manner as to cause the pressure responsive element to follow the movements of said movable wall, and spring means reacting between said tubular member and said valve pin, said spring means being normally under sufficient compression to balance the pressure difference on opposite sides of said movable wall.

6. In a gaseous flow control valve: means defining a passage for the flow therethrough of a gaseous fluid to be controlled, means for supplying a gaseous fluid to said passage, said passage having an inlet and delivering into an outlet chamber, said passage being so proportioned relative to said outlet chamber as to effect a substantial expansion of the gas entering said outlet chamber so that the pressure at the outlet chamber will be materially lower than the pressure upstream of said outlet chamber; a flow control valve adjacent the outlet end of said passage for controlling the flow through said passage, said valve being biased in a closing direction; a diaphragm controlling the movement of said valve; means cooperating with said diaphragm to form on the respective sides thereof a pair of fluid chambers; means forming a connection between one of said fluid chambers and said passage, said connection being arranged to transmit static and dynamic pressure to said fluid one chamber from the region of higher pressure therein; means forming a connection between said one fluid chamber and said outlet chamber; means forming a connection with said other fluid chamber and said passage, said means having an opening facing the flow of fluid through the passage to thereby transmit static and velocity head pressure to said other fluid chamber; and means for controlling the connection between said one fluid chamber and said outlet chamber, said means including a pilot valve for controlling said connection and a movable pressure responsive member for actuating said pilot valve, said movable member being subjected on one side to velocity impact pressure in said passage and being subjected on the other side to static pressure in said passage in such manner that an increase in velocity impact pressure relative to static pressure moves said pilot valve in closing direction.

7. The invention defined by claim 6, wherein the pilot valve controlling the outlet connection of said one chamber has a one-way mechanical connection with said movable member, and there is a spring urging said pilot valve into contact with said movable member.

ROBERT A. ARTHUR.

REFERENCES CITED

The following references are of record in the file of this patent:

UNITED STATES PATENTS

| Number | Name | Date |
|---|---|---|
| 1,685,205 | Stein | Sept. 25, 1928 |
| 1,724,977 | Stein | Aug. 20, 1929 |
| 1,934,713 | Hughes | Nov. 14, 1933 |
| 1,936,650 | Wade | Nov. 28, 1933 |